3,138,560
PROCESS FOR PRODUCING PALLADIUM ON
CARBON CATALYSTS
Carl D. Keith, Summit, and Daniel L. Bair, Roselle Park,
N.J., assignors, by mesne assignments, to Engelhard
Industries, Inc., Newark, N.J., a corporation of
Delaware
No Drawing. Filed Dec. 17, 1959, Ser. No. 860,079
6 Claims. (Cl. 252—447)

This invention relates to improved palladium on carbon catalysts, and to a method for the preparation thereof.

The method of catalyst preparation of this invention results in improved palladium dispersion and highly active catalysts for the $H_2O_2$ reaction, the reaction in which hydrogen or oxygen is purified by the formation of water, thereby eliminating either hydrogen or oxygen from a mixture thereof of the two components.

When sodium palladous chloride or palladium chloride is added to many carbon supports, most of the palladium is immediately deposited as a shiny film of metallic palladium. Generally speaking, these catalysts have low activities, and it appears that the palladium compound is directly reduced to palladium metal by the presence of functional groups, such as aldehydes, or free electrons on the carbon surface.

Past experience with palladium catalyst has indicated that it is advantageous to fix the palladium as an insoluble compound prior to reduction (although there are exceptions to this) either by chemical means or by treatment with hydrogen. For low temperature applications, it is generally preferred to hydrolyze the palladium compound to produce insoluble $Pd(OH)_2$ or $PdO \cdot H_2O$. In the case of chemical reductions, for example by aldehydes, formic acid and the like, the reduction of an insoluble compound allows the metal to be reduced without the problems of migration and crystallite growth which can occur when a metal is reduced from solution.

In the present invention, it has been found that when a basic carbon (i.e., containing free alkali oxides and/or alkaline earth oxides) is impregnated with sodium palladous chloride, the inclusion of an oxidizing agent, such as hydrogen peroxide, for example, in the preparation allows at least some hydrolysis of the palladium prior to reduction by the carbon or by external means. The mechanism by which the hydrogen peroxide functions is not completely clear, but it is believed the following series of reactions, postulated for sodium palladous chloride, may be applicable:

A. Case where $PdCl_2$ is reduced to $Pd°$ by carbon support to give a catalyst of low activity.

$$Na_2PdCl_4 + Carbons^* \rightarrow Carbon—Pd° + 4NaCl$$

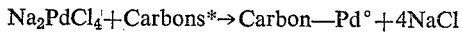

\* Carbon containing, for example, NaOH+intrinsic reducing agent.

B. Case where hydrogen peroxide prevents or minimizes reduction to $Pd°$ by carbon support to give a catalyst with improved activity.

$$Na_2PdCl_4 + H_2O_2 \rightarrow Na_2PdCl_4(OH)_2 Na_2PdCl_4(OH)_2$$
$$+ Carbons^* \rightarrow Carbon—Pd(OH)_4 + 4Nacl$$

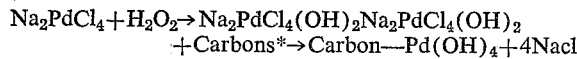

\* Carbon containing, for example, NaOH+intrinsic reducing agent.

In case B, active $Pd°$ is formed by reduction of the hydrolyzed palladium compound.

If the above reactions are correct, dependence is made upon the postulation that the +4-valence palladium of Reaction B is not reduced by the carbon while the +2-valence palladium of reaction A is reduced by the carbon prior to hydrolysis. The possibility that the hydrogen peroxide functions by oxidizing the reducing agent contained by the carbon must be considered; however, the experimental data do not indicate this as the main function of the hydrogen peroxide.

Among the carbons which may be employed as supports for the novel catalyst of the present invention are either granular or powdered carbons which indicate a pH greater than about 4.5 when dispersed in pure water; those granular or powdered carbons are preferred which indicate a pH greater than about 7 when dispersed in pure water and which are capable of reducing a palladium-halogen containing compound to palladium metal.

The palladium concentration on the carbon support may be in the range of about 0.002 to 30 percent, by weight.

Exemplary of the palladium compounds which may be reduced in accordance with the present invention are compounds such as palladium chloride, sodium palladous chloride, potassium palladous chloride, sodium palladous bromide, potassium palladous bromide, and the like. In general, any soluble +2-valance palladium compound containing a halogen may be employed.

Among the oxidizing agents which may be used are various organic oxidizing agents, such as tertiary-butyl peroxide, and inorganic oxidizing agents such as persulfates, perchlorates, and the like; of these, hydrogen peroxide is preferred. The hydrogen peroxide may be present in the range of about 0.1 to 10 moles per mole of metal salt present in the solution to be reduced.

It is sometimes desirable to add a mineral acid to the solution to be reduced and, in such cases, an acid such as hydrochloric, nitric or sulfuric acid may be added to the solution in a concentration such that there is no appreciable evolution of gas when mixed with hydrogen peroxide solution.

Generally speaking, carbon is impregnated with the solution of a palladium-halogen containing compound containing an oxidizing agent. The palladium precipitates almost immediately on the carbon granules. The catalyst is then washed and dried.

Alternatively to the procedure whereby the solution containing the palladium-halogen containing compound and an oxidizing agent is added to the carbon, the carbon may be added to the solution, or the solution sprayed on the carbon so that even the first amounts thereof are evenly distributed.

In those cases where carbon having a high pH is employed, the further addition of mineral acid is desirable. The function of the acid may be in part to remove sulfide fixed on the carbon with alkali or alkaline earth and, for this purpose, acetic acid as well as mineral acid is effective. A strong hydrogen sulfide odor is sometimes produced by the acid treatment of carbon, and hydrogen peroxide may reduce the poisoning effect on palladium resulting from sulfide on the carbon by converting it to sulfate.

The invention will be further illustrated by reference to the following specific example:

EXAMPLE I

A number of catalysts were prepared to illustrate the advantages of the present invention. In all cases, approximately 4 to 8 mesh granular carbons were washed with deionized water, to remove fines and then drained. The carbons were impregnated as indicated below, washed six times by decantation, and dried at a temperature of 100 to 110° C. In all cases, coconut carbons were employed.

*Catalyst A.*—Five hundred grams of carbon were washed, drained and impregnated with a solution of 3.84 grams of $Na_2PdCl_4$ dissolved in 600 ml. of deionized water. The palladium was almost immediately precipitated as a shiny film on the carbon granules. The catalyst was washed and dried; the dry catalyst had a shiny metallic appearance.

*Catalyst B.*—A 100 gram lot of catalyst was prepared by the general procedure employed for the preparation of Catalyst A, except that 1.5 moles of hydrogen peroxide per mole of palladium was added to the sodium palladous chloride five minutes prior to use. It was observed that some palladium hydrolysis occurred after impregnation. The catalyst was washed and dried; the dried catalyst had a dull black appearance.

*Catalyst C.*—A 200 gram lot of catalyst was prepared by the general procedure used for the preparation of Catalyst B, but with a new lot of the same type carbon. It was observed that there was considerable gas evolution when the hydrogen peroxide was added to the sodium palladous chloride; the solution was allowed to stand for fifteen minutes. There was very little noticeable hydrolysis after impregnation. The catalyst was washed and dried; the dried catalyst was moderately shiny in appearance.

*Catalyst D.*—This catalyst was prepared using the same method as Catalyst C, except that about 0.2 ml. of concentrated reagent grade hydrochloric acid was added per gram of palladium to a portion of the same lot of sodium palladous chloride solution as employed in the preparation of Catalyst C. There was no gas evolution when the hydrogen peroxide was added to the acidified sodium palladous chloride solution. The catalyst was washed and dried; the dried catalyst had a dull black appearance.

*Catalyst E.*—This catalyst was prepared using the same procedure as that employed for Catalyst D, except that the hydrogen peroxide was not added to the acidified sodium palladous chloride solution. The catalyst was washed and dried; the dried catalyst had a shiny metallic appearance.

*Catalyst F.*—A 200 gram lot of catalyst was prepared from the same lot of material as Catalyst C. The primary difference in the preparation of the catalyst was that the washed and drained carbon was soaked in 200 ml. of solution containing about 0.1 ml. of concentrated hydrochloric acid plus 0.8 ml. of 30 percent hydrogen peroxide for fifteen minutes. Free solution was drained from the carbon and the treated carbon was impregnated with 180 ml. of sodium palladous chloride solution containing 0.4 gram of palladium. The catalyst was washed and dried; the dried catalyst contained a mixture of shiny and dull black faced granules.

*Catalyst G.*—A 200 gram lot of catalyst was prepared by the general procedure used for Catalyst A, except that a carbon was employed which indicated a pH of 10.2 when 10 grams thereof were added to 50 ml. of deionized water. The dried catalyst was moderately shiny in appearance.

*Catalyst H.*—This catalyst was prepared by the same general procedure as Catalyst C, except that the same carbon was used as was employed in the preparation of Catalyst G. As in the case of Catalyst C, there was considerable gas evolution when the hydrogen peroxide was added to the sodium palladous chloride solution. The dried catalyst was moderately shiny in appearance.

*Catalyst I.*—This catalyst was prepared by the same general procedure employed for the preparation of Catalyst D, except that the same carbon was used as was employed in the preparation of Catalyst G. As in the case of Catalyst D, there was no gas evolution when the hydrogen peroxide was added to the acidified sodium palladous chloride solution. The dried catalyst was dull black in appearance.

The above catalysts were evaluated for the hydrogen-oxygen reaction and examined by X-ray diffraction to determine the crystallite size, and relative amounts of palladium with a crystallite size larger than about 50 Å. Palladium assays were made for some of the samples.

In the evaluation of the catalysts, a test sample of each catalyst was placed in a test cell between two plugs of glass wool, and a standard mixture of hydrogen and oxygen was passed through the test cell. The activity of the catalyst for the reaction of hydrogen and oxygen was then compared with the activity of a standard palladium on alumina catalyst for the hydrogen-oxygen reaction, and the efficiency of the catalyst was calculated according to the following equation:

$$E = \frac{M}{g} \log F$$

where

E = efficiency,
M = gas flow rate past the catalyst, in liters per hour,
g = weight of catalyst under test, in grams, and
F = the purification factor, which is $$\frac{\text{Percent oxygen flowing into catalyst}}{\text{Percent oxygen flowing out of catalyst}}$$

The following table compares the data obtained for the catalysts prepared as described above:

*Table I*

| Catalyst No. | Procedure | "DEOXO"[1] Efficiency | Assay, Percent Pd | Rel Amt. of Pd° ≥ 50 A. | Crystallite Size of Pd° ≥ 50 A. | Appearance |
|---|---|---|---|---|---|---|
| A | $Na_2PdCl_4$, no $H_2O_2$, no HCl | 9 | | High | ca. 100 | Shiny metallic. |
| B | $Na_2PdCl_4 + H_2O_2$, no HCl | 25 | | Nil | | Dull black. |
| C | $Na_2PdCl_4 + H_2O_2$, no HCl | 95 | | Medium | ca. 100 | Moderately shiny. |
| D | $Na_2PdCl_4 + HCl + H_2O_2$ | 146 | 0.22 | Low | 200 | Dull black. |
| E | $Na_2PdCl_4 + HCl$, no $H_2O_2$ | 41 | | Very high | 90 | Shiny metallic. |
| F | $H_2O_2 + HCl$ to carbon prior to $Na_2PdCl_4$ | 24 | | Medium | 60 | Mixture of shiny and dull black particles. |
| G | $Na_2PdCl_4$, no $H_2O_2$, no HCl | 29 | 0.23 | do | 60 | Moderately shiny |
| H | $Na_2PdCl_4 + H_2O_2$, no HCl | 58 | | do | 100 | Do. |
| I | $Na_2PdCl_4 + HCl + H_2O_2$ | 110 | 0.24 | Nil | | Dull black. |

[1] Efficiency = $\frac{\text{gas flow (liters per hr.)}}{\text{grams of catalyst}} \log \frac{O_2 \text{ in}}{O_2 \text{ out}}$ Comparison of the data for Catalysts A and B shows that the addition of hydrogen peroxide to the sodium palladous chloride produced a catalyst having greatly improved activity and palladium dispersion.

Comparison of the data for Catalysts C and E shows that hydrogen peroxide is much more effective than hydrochloric acid when added to the sodium palladous chloride.

Comparison of the palladium dispersion for Catalysts B and C indicates that the hydrogen peroxide was much more effective in Catalyst B. Since hydrogen peroxide decomposition was observed in the preparation of Catalyst C, it is believed that less decomposition occurred in the preparation of Catalyst B. Possibly, the sodium palladous chloride used for Catalyst C contained sufficient palladium metal to destroy a major part of the hydrogen peroxide before it could be utilized.

Comparison of the data for Catalysts C and D indicates the benefits of adding a small amount of hydrochloric acid.

Comparison of the data for Catalysts D and F indicates the advantage of adding hydrogen peroxide and hydrochloric acid to the sodium palladous chloride solution rather than to the carbon.

Comparison of the activity data for Catalysts G and H also indicates the advantages of hydrogen peroxide addition.

Comparison of the data for Catalysts H and I also indicates the improvement effected by the use of a small amount of hydrochloric acid in conjunction with the hydrogen peroxide.

It will be obvious to those skilled in the art that many modifications may be made within the scope of the present invention without departing from the spirit thereof, and the invention includes all such modifications.

What is claimed is:

1. A process for producing a palladium on carbon catalyst which comprises impregnating a carbon support with an aqueous solution of a water-soluble +2 valence palladium compound containing a halogen of the group consisting of chlorine and bromine, the aqueous solution also containing a per oxygen compound as an oxidizing agent, the carbon support indicating a pH greater than about 4.5 when dispersed in pure water, whereby the palladium compound is hydrolyzed on the carbon and the palladium on the carbon is subsequently reduced.

2. A process according to claim 1 in which the oxidizing agent is hydrogen peroxide.

3. A process according to claim 1 in which the aqueous solution also contains a mineral acid.

4. A process according to claim 1 in which the support indicates a pH in excess of 7 when dispersed in pure water.

5. A process according to claim 1 in which the palladium compound is palladium chloride.

6. A process according to claim 1 in which the palladium compound is sodium palladous chloride.

References Cited in the file of this patent

UNITED STATES PATENTS

| | | |
|---|---|---|
| 1,989,107 | Morrell | Jan. 29, 1935 |
| 2,516,233 | McKinnis | July 25, 1950 |
| 2,731,497 | McCormick et al. | Jan. 17, 1956 |
| 2,749,359 | Calkins et al. | June 5, 1956 |
| 2,802,794 | Sprauer | Aug. 13, 1957 |

UNITED STATES PATENT OFFICE
CERTIFICATE OF CORRECTION

Patent No. 3,138,560                                June 23, 1964

Carl D. Keith et al.

It is hereby certified that error appears in the above numbered patent requiring correction and that the said Letters Patent should read as corrected below.

Column 1, line 15, for "$H_2O_2$" read -- $H_2$-$O_2$ --; line 52, for "Carbons*" read -- Carbon* --; same column 1, lines 61 and 62, the catalyst should appear as shown below instead of as in the patent:

$Na_2PdCl_4 + H_2O_2 \rightarrow Na_2PdCl_4(OH)_2$

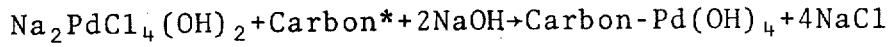

$Na_2PdCl_4(OH)_2 + Carbon^* + 2NaOH \rightarrow Carbon\text{-}Pd(OH)_4 + 4NaCl$ Signed and sealed this 22nd day of June 1965.

(SEAL)
Attest:

ERNEST W. SWIDER                              EDWARD J. BRENNER
Attesting Officer                                   Commissioner of Patents